US012048664B2

(12) United States Patent
Gard

(10) Patent No.: US 12,048,664 B2
(45) Date of Patent: Jul. 30, 2024

(54) APPARATUS AND METHOD FOR SPINAL ALIGNMENT THERAPY

(71) Applicant: Lance Gard, Cary, NC (US)

(72) Inventor: Lance Gard, Cary, NC (US)

(73) Assignee: Lance Gard, Cary, NC (US)

( * ) Notice: Subject to any disclaimer, the term of this patent is extended or adjusted under 35 U.S.C. 154(b) by 814 days.

(21) Appl. No.: 17/034,991

(22) Filed: Sep. 28, 2020

(65) Prior Publication Data

US 2022/0096310 A1 Mar. 31, 2022

(51) Int. Cl.
*A61H 1/02* (2006.01)
*A61H 1/00* (2006.01)

(52) U.S. Cl.
CPC .......... *A61H 1/0292* (2013.01); *A61H 1/008* (2013.01); *A61H 2201/0134* (2013.01); *A61H 2201/0142* (2013.01); *A61H 2201/0192* (2013.01); *A61H 2201/1253* (2013.01); *A61H 2201/1623* (2013.01); *A61H 2201/1645* (2013.01); *A61H 2201/1647* (2013.01); *A61H 2201/168* (2013.01); *A61H 2203/0456* (2013.01)

(58) Field of Classification Search
CPC .......... A61H 1/0292; A61H 2201/0134; A61H 2201/0192; A61H 2201/1623; A61H 2201/1645; A61H 2203/0456; A61H 1/005; A61H 1/0296; A61H 2201/0142; A61H 2201/0146; A61H 2201/1253; A61H 2201/1647; A61H 2201/168; A61H 2201/5023; A61H 2205/081; A61H 1/0222; A61H 7/001; A61G 13/009; A61G 13/0054; A61G 13/1225; A61G 13/122; F16D 11/14; F16C 11/10; Y10T 403/32442; Y10T 403/32451; Y10T 403/32459
USPC .......................................... 606/240, 243–245
See application file for complete search history.

(56) References Cited

U.S. PATENT DOCUMENTS 1,282,580 A * 10/1918 Hosford et al. ..... A61H 1/0218 606/241
1,482,173 A * 1/1924 Willard ................... A61H 1/02 606/240

(Continued)

FOREIGN PATENT DOCUMENTS

CN 208339740 U 1/2019
CN 208626124 U 3/2019

(Continued)

*Primary Examiner* — Justine R Yu
*Assistant Examiner* — Benjamin M. Kusiak
(74) *Attorney, Agent, or Firm* — Burr & Forman LLP

(57) ABSTRACT

A treatment apparatus for providing spinal compensation therapy may include a base structure configured to support a patient lying in a supine position on the treatment apparatus, and an incrementally configurable adjustment assembly configured to modify the base structure between an initial configuration, an intermediate configuration, and a target configuration. The initial configuration may define spinal curves generated based on initial patient parameters associated with evaluation of the patient to define a first increment in progress toward the target configuration, and the intermediate configuration may define modified spinal curves relative to the initial configuration to define a second increment in the progress toward the target configuration.

20 Claims, 10 Drawing Sheets

(56) References Cited

U.S. PATENT DOCUMENTS

| | | | | |
|---|---|---|---|---|
| 1,602,196 | A * | 10/1926 | Iverson | A61H 1/02 601/92 |
| 1,984,520 | A * | 12/1934 | Curtis | A61H 39/06 606/240 |
| 2,672,860 | A * | 3/1954 | Badger | A61H 23/04 601/149 |
| 2,926,660 | A * | 3/1960 | Thompson | A61G 13/009 5/613 |
| 3,092,102 | A * | 6/1963 | Thompson | A61G 13/009 606/242 |
| 4,050,454 | A * | 9/1977 | Ekholm | A61G 13/009 606/242 |
| 4,528,705 | A * | 7/1985 | Greenawalt | A47G 9/10 5/636 |
| 4,586,493 | A * | 5/1986 | Goodman | A61H 23/0263 601/116 |
| 4,686,968 | A * | 8/1987 | Scherger | A61H 1/008 606/237 |
| 4,903,412 | A * | 2/1990 | Pedrow | A47G 9/10 606/240 |
| 4,981,131 | A * | 1/1991 | Hazard | A47C 7/467 601/24 |
| 5,070,865 | A * | 12/1991 | Iams | A47G 9/1009 606/240 |
| 5,099,831 | A * | 3/1992 | Freed | A61H 1/0292 601/24 |
| 5,123,768 | A * | 6/1992 | Franklin | F16C 11/10 403/96 |
| 5,279,310 | A * | 1/1994 | Hsien | A61F 5/01 606/240 |
| 5,713,841 | A * | 2/1998 | Graham | A61H 1/0218 606/240 |
| 6,076,525 | A * | 6/2000 | Hoffman | A61G 13/0054 128/845 |
| 6,190,338 | B1 * | 2/2001 | Arndt | A61G 13/009 601/102 |
| 6,652,564 | B1 * | 11/2003 | Harris | A61H 1/0292 606/240 |
| 8,100,846 | B1 * | 1/2012 | LaMonica | A61F 5/048 601/39 |
| 9,474,680 | B2 | 10/2016 | Fitzloff | |
| 9,949,884 | B2 | 4/2018 | Kaczmarek et al. | |
| 10,111,800 | B2 * | 10/2018 | Sova | A61H 1/0218 |
| 10,245,173 | B2 | 4/2019 | Badger | |
| 2003/0045409 | A1 * | 3/2003 | Herbst | A61H 1/0292 482/142 |
| 2004/0147959 | A1 * | 7/2004 | Shin | A61H 39/04 601/134 |
| 2006/0178603 | A1 * | 8/2006 | Popescu | A47C 7/465 601/84 |
| 2007/0022535 | A1 * | 2/2007 | Yue | A61G 13/0054 5/691 |
| 2007/0233190 | A1 * | 10/2007 | Forsey | A61H 23/0254 606/237 |
| 2010/0211099 | A1 * | 8/2010 | Radermacher | A61G 13/009 606/245 |
| 2011/0040219 | A1 * | 2/2011 | Tanner | A61H 1/0292 601/128 |
| 2011/0126872 | A1 * | 6/2011 | Albertyn | A61H 3/02 135/69 |
| 2011/0288586 | A1 * | 11/2011 | Auman | A61B 5/1077 606/242 |
| 2012/0226311 | A1 * | 9/2012 | Normandin | A61H 7/001 606/240 |
| 2013/0018417 | A1 * | 1/2013 | Goldberg | A61F 5/01 606/240 |
| 2014/0221881 | A1 | 8/2014 | Schlauder et al. | |
| 2014/0277300 | A1 * | 9/2014 | Lee | A61H 39/08 607/96 |
| 2015/0290063 | A1 * | 10/2015 | Santinelli Ramos | A61G 13/009 5/600 |
| 2016/0128902 | A1 * | 5/2016 | Cox | A61H 23/0254 606/237 |
| 2017/0360642 | A1 | 12/2017 | Sepulveda | |
| 2019/0254907 | A1 | 8/2019 | Miller | |
| 2019/0339593 | A1 * | 11/2019 | Mayville | A61F 5/048 601/39 |

FOREIGN PATENT DOCUMENTS

| | | | |
|---|---|---|---|
| CN | 209091790 | U | 7/2019 |
| KR | 20140112855 | A | 9/2014 |
| KR | 102074518 | B1 | 10/2019 |

* cited by examiner

APPARATUS AND METHOD FOR SPINAL ALIGNMENT THERAPY

TECHNICAL FIELD

Example embodiments generally relate to chiropractic instruments and, more particularly, relate to an apparatus and method for enabling at-home treatment of a misaligned spine.

BACKGROUND

In recent years, medical professionals have noted an increase in the number of patients needing treatment for back and posture problems. Many of those affected are young adults, teenagers and children, so showing signs of back problems normally attributed to people older than this demographic comes as a surprise. While many medical professionals attribute the trend to the widespread popularity of handheld electronics, a definite root cause of the issue remains unknown. Despite the nature of the cause, the problem remains that an increasing number of people are experiencing misaligned spines resulting in poor posture and other general discomfort.

Additional problems posed by the aforementioned trend include the cost of frequent visits to the chiropractor for alignments, and the ability of patients to physically get to the chiropractor for those visits. As such, these ailments can tend to go untreated for extended periods of time.

Thus, it may be desirable to have a method of providing those affected by a misaligned spine with the treatment they need under circumstances that work better for them.

BRIEF SUMMARY OF SOME EXAMPLES

Some example embodiments may provide a treatment apparatus for providing spinal compensation therapy. The treatment apparatus may include a base structure configured to support a patient lying in a supine position on the treatment apparatus, and an incrementally configurable adjustment assembly configured to modify the base structure between an initial configuration, an intermediate configuration, and a target configuration. The initial configuration may define spinal curves generated based on initial patient parameters associated with evaluation of the patient to define a first increment in progress toward the target configuration, and the intermediate configuration may define modified spinal curves relative to the initial configuration to define a second increment in the progress toward the target configuration.

In another example embodiment, a method for providing spinal compensation therapy for a patient may be provided. The method may include receiving baseline data comprising initial patient parameters, evaluating the baseline data to determine a treatment plan comprising at least an initial configuration, an intermediate configuration, and a target configuration for a configurable treatment apparatus, and defining parameters for the treatment apparatus according to the initial configuration, the intermediate configuration, and the target configuration along with corresponding periods of time over which the patient is directed to lie in a supine position on the treatment apparatus.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1A:
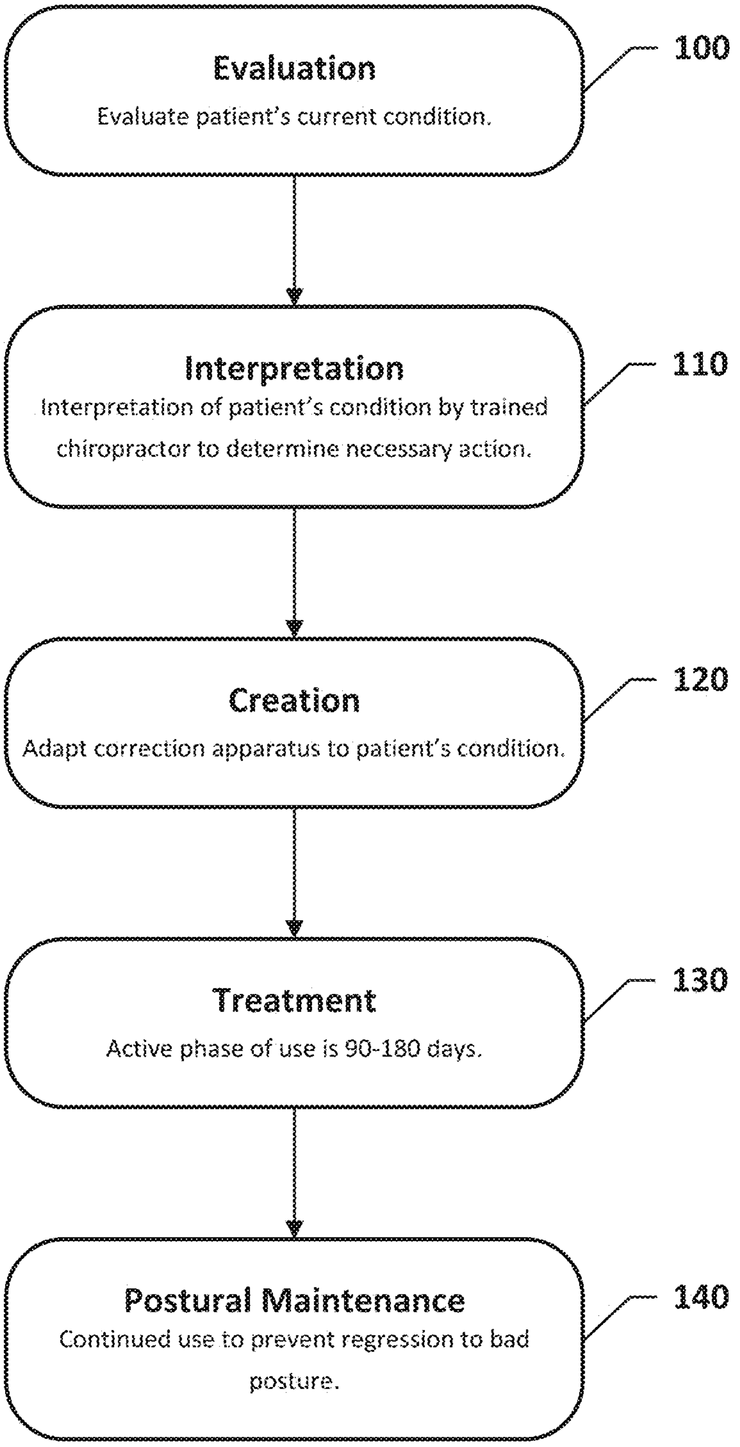
FIG. 1A illustrates a flowchart for a method of providing compensation treatment for a spine in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Current practices for treating general spinal discomfort or more severe misalignment of the spine may consist of a patient going for a visit to the chiropractor to receive alignment treatment on a recurring basis. As such, these visits can add up costs for the patients in regards to money and time. Thus, there is a direct need for a practical alternative that, under direction of a trained professional, can decrease the frequency and costs of in-office treatment sessions for the patient by providing an apparatus and treatment method for providing incremental improvement in spinal alignment. Current spinal alignment apparatuses exist and generally consist of braces, support inserts for chairs, and perhaps small wheel-like objects intended to roll out the muscles in one's back.

As opposed to exclusively improving posture or alleviating pain, example embodiments may provide a method and apparatus that actively works to restore and maintain the natural curvature of the spine in an incremental process that is tailored to the patient. By treating the cause of the problem (a misaligned spine) as opposed to the symptoms (pain and poor posture), the patient can experience a better quality of life and have less worry of symptoms returning in the future. Moreover, by defining an incremental process that is tailored to the patient, a more effective and less costly treatment plan may be defined until a final maintenance stage is reached. The maintenance stage can then be conducted indefinitely using the already configured device of example embodiments.

Some example embodiments may provide for a software application and processing circuitry that can be useful in defining the overall method for preparing the proper treatment for patients suffering from misaligned spines, and ultimately for defining parameters for the device via which such treatment is administered. Medical professionals may rely on software programs configured in this way to help provide better care for those in need. Often these programs will necessitate additional training in order for an individual having the medical knowledge to be able to successfully develop treatments for their patients to be able to take full advantage of the program's abilities. Medical professionals who receive this additional program training can be extremely valuable to the patient and to the community at large.

FIG. 1A illustrates a flowchart of an overall method for providing therapy for a misaligned spine in accordance with an example embodiment. The method may include evaluating a patient's current condition or initial state at evaluation operation 100. The method may further include interpreting the patient's condition (e.g., by a trained professional or chiropractor) in order to determine necessary next steps at interpretation operation 110. The method may further include adapting or defining a correction apparatus to the patient's condition at creation operation 120. The method may also include employing an active treatment phase (e.g., for a predetermined period of time) during treatment operation 130. The method may also include continuing use of the correction apparatus to prevent regression to bad posture during postural maintenance operation 140. Various ones of these operations (e.g., the creation operation 120) may further include smaller action items that are executed in order to complete the larger operation, thereby illustrating the flexible nature of all operations included in the overall method. Due to the nature of treatment being tailored to each individual, some operations may be different for one individual than the same operation would be for another individual. In this regard, the overall method may be subject to change and the flowchart of FIG. 1A is more or less a starting point from which the method may deviate.

The method of FIG. 1A should also be understood to extend beyond a mere organization of the activities of a medical professional. Instead, as will be discussed in greater detail below, the method of FIG. 1A may be guided and executed by a computer program or application that is executed under control of the medical professional to facilitate processing of the data received in various operations in order to define parameters for treatment, including specific parameters for the device that will be used for such treatment. Thus, to the extent various activities of the medical professional are discussed below, such activities should be understood to occur responsive to guidance or instruction from the computer program or application in some embodiments.

Figure 1B:
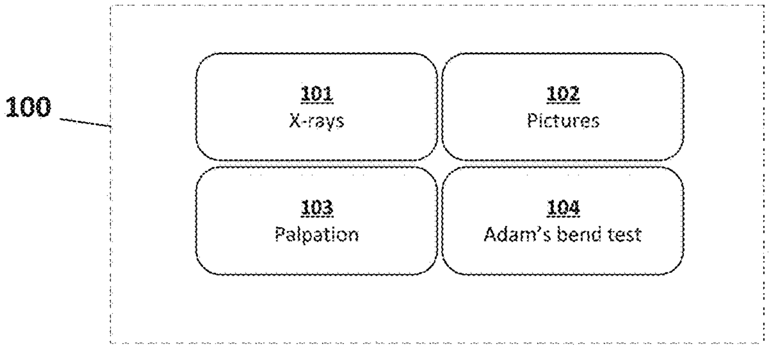
FIG. 1B illustrates, in greater detail, an evaluation operation of the overall method in accordance with an example embodiment.

FIG. 1B depicts the evaluation operation 100 in greater detail. In the evaluation operation 100, a medical professional may be tasked with gathering sufficient baseline data on the current (pre-treatment) state of the patient. As shown in FIG. 1B, establishing a baseline may be done a number of ways including one or more of taking x-rays 101, pictures 102, palpation 103, and utilizing Adam's bend test 104. Information associated with any or all of these activities may be inserted into the computer program or application for processing. Such information may also include other standard information such as height, weight, age, etc.

X-rays 101 may be a way to identify potential problems with specific areas or discs in the spine and as such, are very useful for detecting signs of certain conditions such as degenerative disc disease. Additionally, x-rays 101 are useful in showing a detailed view of the spine's curvature and enable the trained medical professionals to identify problematic regions of a particular patient. Pictures 102 are valuable for comparison's sake. In this scenario, a patient may stand in front of a chart on a wall while the trained medical professional may take a profile view picture. The chart may have different measurement reference markers or curves on it indicating the level of severity of the posture of a patient. Whichever curve the patient lines up most closely with may be useful in determining the type and degree of the treatment that gets developed for that patient. As an alternative or in addition to using pictures 102 to determine an amount of compensation to apply to various sections of the spine, the medical professional may have the option to utilize palpation 103 in order to use their hands to feel which muscles in the patient are in a hypertonic state and which are in a hypotonic state. This will tell the doctor what the patient's body's natural response is to compensate for the misalignment of their spine.

Adam's bend test 104 is a forward bend test that is useful in detecting scoliosis. In this test, the patient may be bare-back and bend forward at the waist while the medical professional examines the patient for asymmetries, perhaps using a device such as a scoliometer. The scoliometer is a common medical device used in chiropractic practices to determine the angle of trunk rotation in patients with scoliosis. In other words, a patient with scoliosis may show signs of one side of the rib cage being higher than the other when performing Adam's bend test. The scoliometer can be used to measure the angle of the tilt of the back to quantify the severity of the condition. At least the procedures described above may yield important data for a trained medical professional to utilize in the interpretation operation 110.

Figure 2:
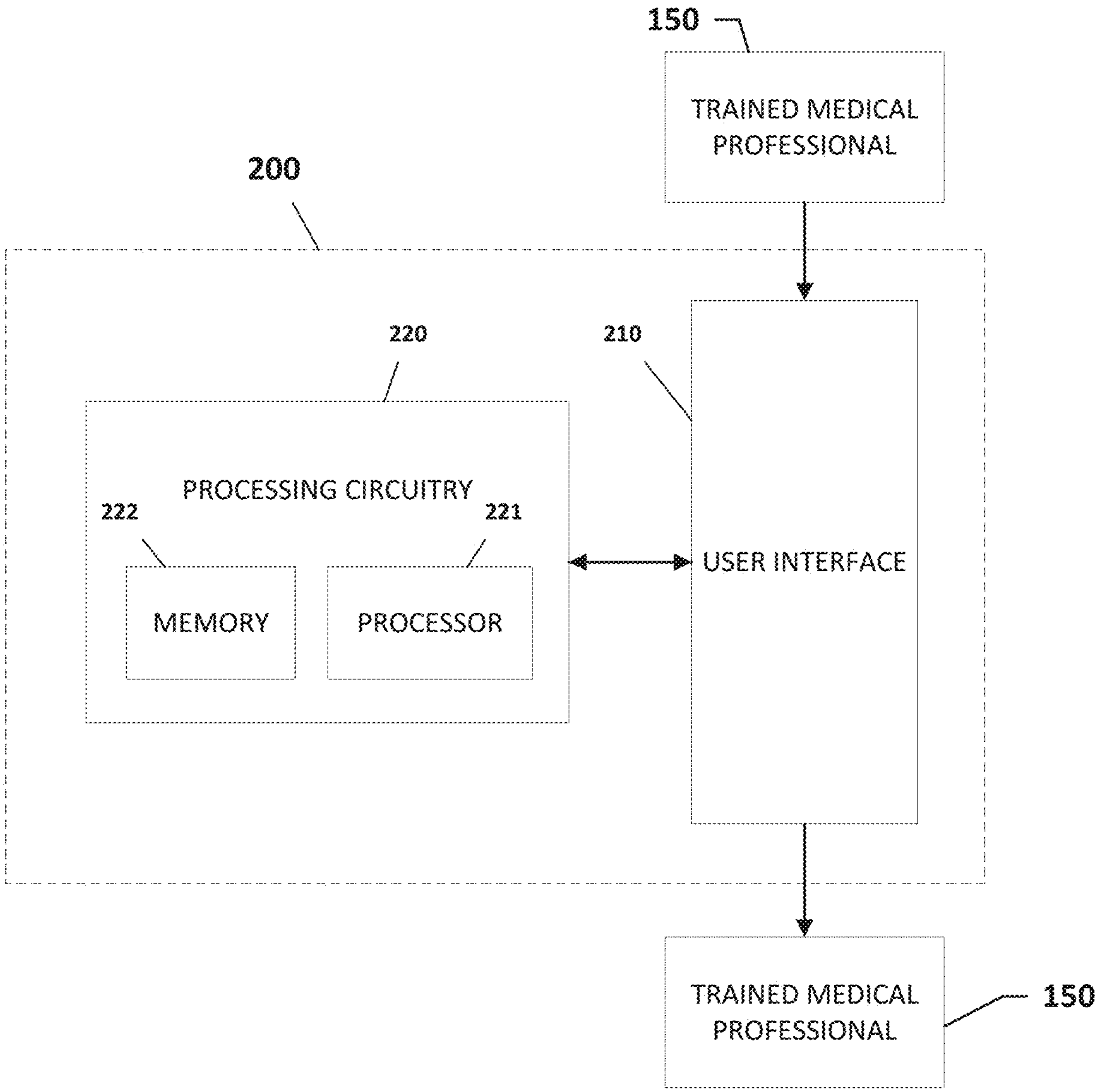
FIG. 2 illustrates a block diagram of some components of a particular stage of the overall method of FIG. 1 in accordance with an example embodiment.

The interpretation operation 110 may include an evaluation of the data and information gathered during the evaluation operation 100. In the interpretation operation 110, the trained medical professional 150 may utilize data gathered in the evaluation operation 100 and they may input the baseline data into an application on a computational device 200 (see FIG. 2). The computational device 200 may be configured to run an application. The computational device 200 and the application may be configured to receive inputs through a user interface 210 and process the data in processing circuitry 220. An application may be configured to receive input data, and based on the input data, the application may be able to compute the ideal spinal curvature for a specific patient. The processing circuitry may comprise at least a processor 221 and memory 222. The processing circuitry 220 may then interact with the user interface 210 to provide theft medical professional 150 with the results of running the program. Results of running an application may come in a plurality of formats including but not limited to numerical outputs, written text outputs, graphical outputs and geometric outputs. The results of a trained medical professional 150 running the application may include an outline for the incremental process found in the treatment operation 130. The results of using the application combined with the opinions of the medical professional 150 may, in some cases, carry over into the creation operation 120.

Figure 1C:
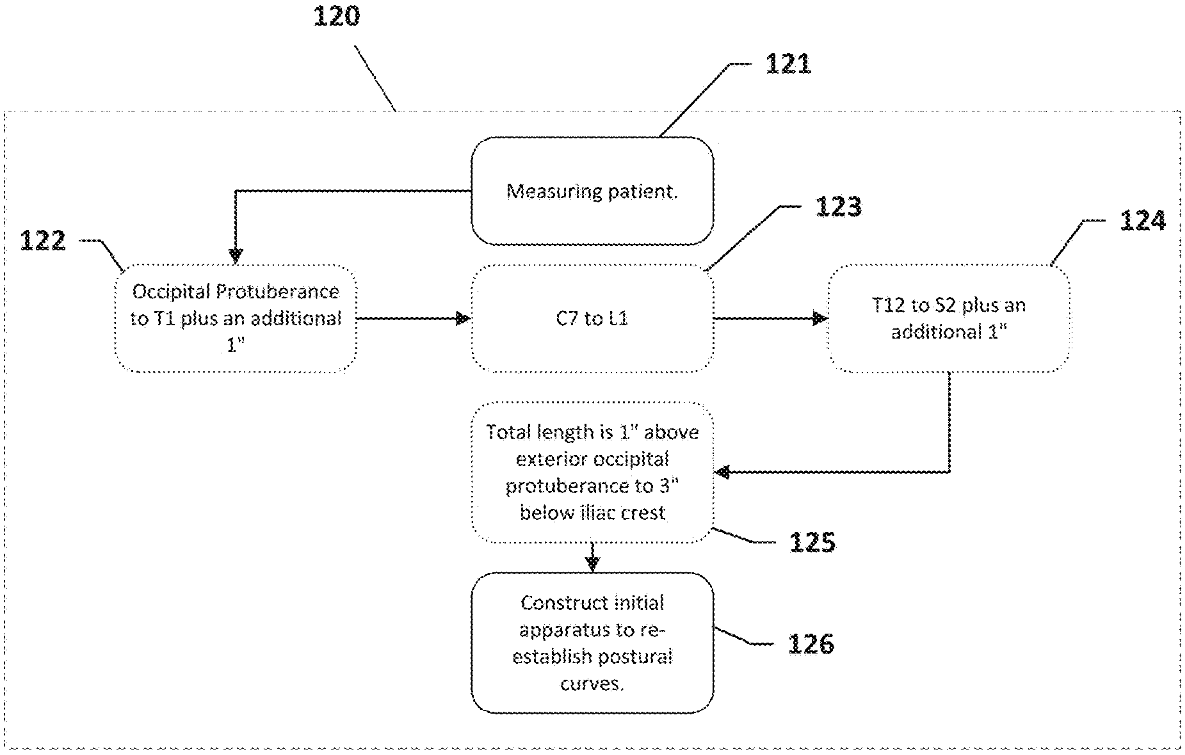
FIG. 1C illustrates, in greater detail, a creation operation of the overall method in accordance with an example embodiment.

The creation operation 120 is illustrated in greater detail in FIG. 1C. The creation operation 120 may first comprise taking measurements 121 of the patient in order to determine the size and configuration (e.g., settings or parameters) of an apparatus needed to provide adequate treatment to the patient. Precise measuring may be done in this operation in order to form fit an apparatus as best as possible. The measurements may comprise different values relating to different regions of the spine. A first measurement 122 may be taken from the occipital protuberance to T1 plus an additional inch. A second measurement 123 may be taken from C7 to L1, a third measurement 124 may be taken from T12 to S2 plus an additional inch, and a fourth measurement 125 for the total length may be taken from one inch above the exterior occipital protuberance to three inches below the iliac crest. Following the collection of measurements 121 and the results of the interpretation operation 110, all necessary information for creating an apparatus and relative components may be known and may be inserted into the computational device 200. It should be understood that one skilled in the art of the spinal anatomy, such as a trained medical professional, is capable of conducting such measurements with ease.

In an example embodiment, the computational device 200 may (e.g., via configuration of the processing circuitry 220) be configured to take all of the information provided from evaluation operation 110, interpretation operation 120, and the measurements captured in operations 121-125 and construct a model or otherwise generate parameters for an initial apparatus for compensation therapy at operation 126. In some cases, the initial apparatus may include parameters that are all within a predefined threshold of initial parameters for the individual patient. Thus, it can be appreciated that each treatment case (and therefore each initial apparatus model) is unique. The memory 222 may include lookup tables that define corresponding treatment apparatus structural parameters for initial use for a given patient based on the measurements and information received. For example, the patient's height, spine length, curvature details in each of the regions of the spine and/or other information may be correlated to structural parameters that will create a treatment apparatus that tends to provide compensation toward an improved or ideal spinal curvature and posture. The treatment apparatus itself (which will be discussed in greater detail below), may include basic modeled parameters that can be altered for each individual patient based on the configuration of the processing circuitry 220.

Figure 1D:
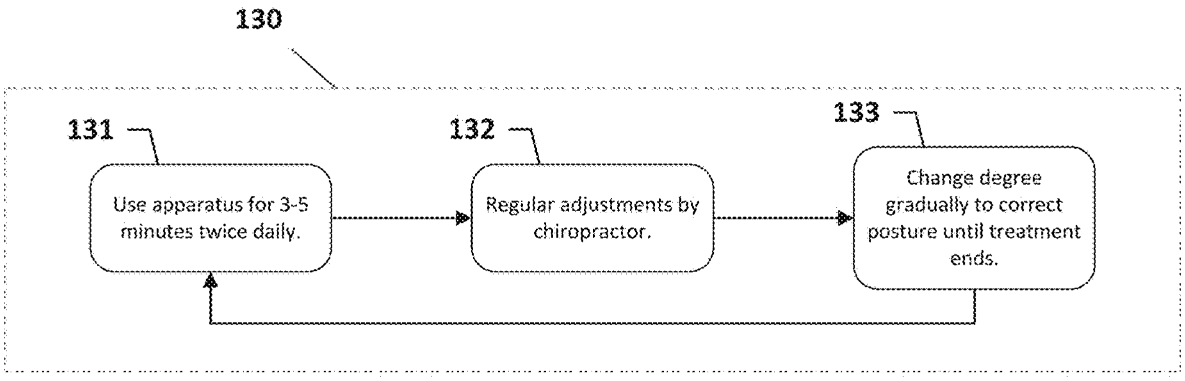
FIG. 1D illustrates, in greater detail, a postural maintenance operation of the overall method in accordance with an example embodiment.

Given that a treatment apparatus and components have been created following the completion of the creation operation 120, the treatment operation 130 may mark the beginning of administering treatment via a treatment protocol, and thus the use of the treatment apparatus through a series of re-configurations or modifications that progress the patient toward improved spinal alignment. FIG. 1D illustrates one example of how the treatment operation 130 may be defined for a patient in greater detail. The so-called "active phase" of the treatment operation 130 may last at least ninety days and less than one hundred and eighty days. The patient may, for example, be instructed to start out by using the treatment apparatus for three to five minutes, two times per day for a predetermined period of time at operation 131. However, example embodiments may include specialized instruction from a medical professional, in which case the suggested timeline of the treatment operation 130 may become a mere starting point that can be adjusted as needed. Part of the treatment operation 130 may also include adjustments by the chiropractor at operation 132 at less frequent intervals than if the treatment apparatus was not in use. However, operation 132 may be entirely optional in some cases. Additionally, the treatment operation 130 may comprise incrementally changing the degree of an apparatus at operation 133 to gradually work the patient into better spinal curvature over time.

Operation 133 may include a series of settings or parameters for altering the configuration of the treatment apparatus in accordance with a progressive therapy that incrementally changes the treatment apparatus structure such that by employing operation 131 repeatedly, the patient will see changes (i.e., improvements) to his/her spinal alignment and curvature. In an example embodiment, the lookup table used for defining the initial model for the treatment apparatus (or another lookup table) may be used to define the parameters for each progressive step (and therefore each progressive configuration of the treatment apparatus). Thus, for example, the processing circuitry 220 may be configured to define an initial model or structure for the treatment apparatus, and also determine a number of steps and corresponding additional models or structures (e.g., entirely new structures, or modifications to the initial model or structure) to be used for the treatment protocol. In some cases, the processing circuitry 220 may be aware of the initial measurements of the patient and may define a target or goal configuration (which will be used for maintenance later on). The difference between the initial measurements and the target configuration may dictate the number of intermediate steps (and models or structures) that will form the treatment protocol. In this regard, for example, there may be a limit to the amount of curvature change that is allowed for each step or model/structure change. The difference between the initial measurement and the target configuration (for each section of the spine), may be divided by the corresponding maximum change allowed for any intermediate steps (generally or specific incremental limits for each section of the spine) to determine the number of intermediate models to use. The intermediate models may then define configurations that gradually head in the direction toward the target configuration.

Figure 1E:
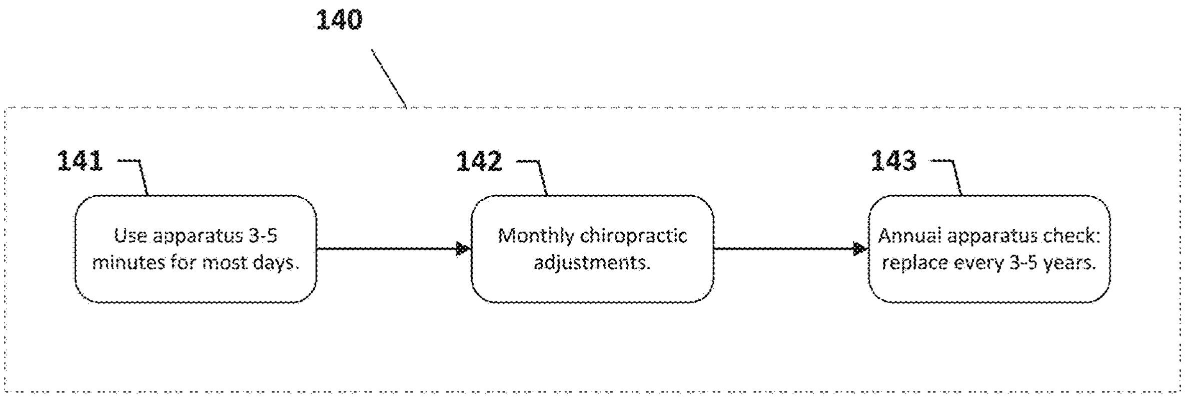
FIG. 1E illustrates, in greater detail, a particular operation of the overall method in accordance with an example embodiment.

The ensuing operation once the treatment operation 130 is completed is the postural maintenance operation 140. This operation is provided in greater detail by FIG. 1E. In the treatment operation 130, the patient may utilize the final increment of the incremental treatment plan (e.g., the target configuration) and continue to use the treatment apparatus going forward with the corresponding target configuration. In some cases, the only difference in the maintenance operation 140 may be that the patient may use the treatment apparatus less frequently than in the treatment operation 130. In particular the patient may go from twice per day to once per day 141, down to monthly adjustments 142, and annual apparatus checks 143 (e.g., for maintenance and upkeep of the treatment apparatus. Again, all aforementioned timeframes should be understood as baseline starting points, from which the prescribed treatment plan may deviate based on personalized instruction from the medical professionals.

Figure 3A:
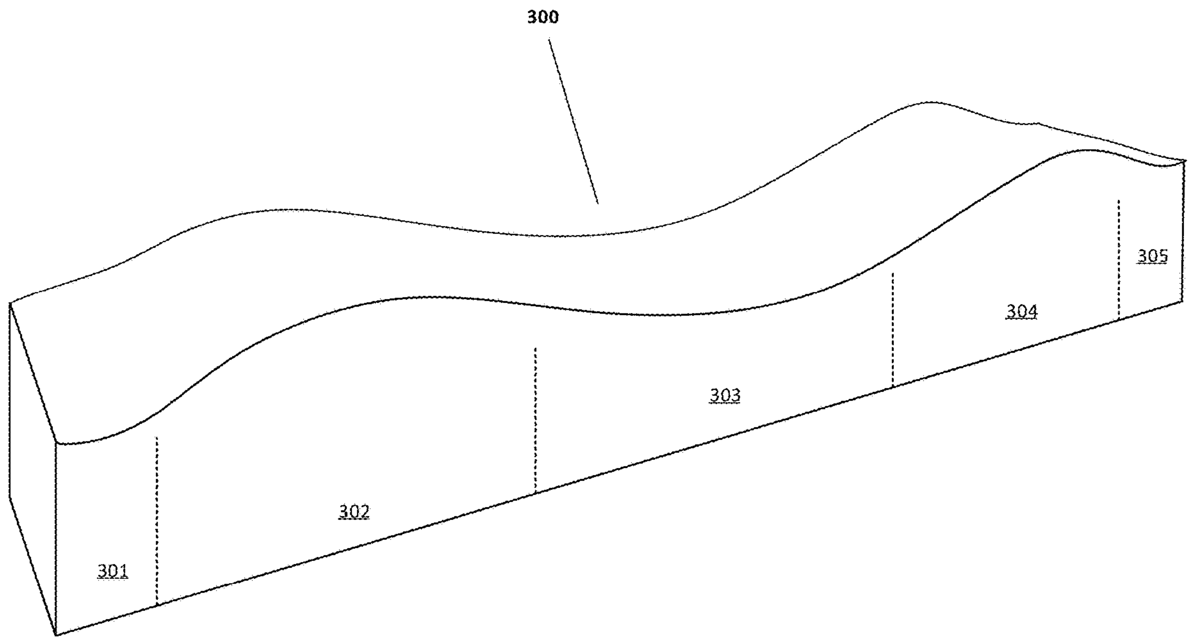
FIG. 3A illustrates an isometric view of an apparatus according to an example embodiment.

FIG. 3A illustrates an isometric view of an example embodiment of a treatment apparatus 300. As shown in FIG. 3A, the treatment apparatus 300 may include a curved geometry (among a series of such curved geometries) designed specifically to gradually restore the proper curvature to the patient's spine. According to an example embodiment, the treatment apparatus 300 may additionally have regions marked out on a side indicating where each part of the spine should be located while the treatment apparatus 300 is in use. These regions may include sacrum 301, lumbar 302, thoracic 303, cervical 304 and occiput 305. However, it is not necessary for the regions to be specifically identified and, in some cases, the user may simply be instructed as to at which end the head should be placed. In an example embodiment, the treatment apparatus 300 may be designed to be laid on by the patient with the patient's back contacting the upward facing curved surface of the treatment apparatus 300. The patient may situate himself/herself so that the occipital protuberance is positioned in the occiput region 305. Accordingly, the patient's sacrum should be positioned in the sacrum region 301. If there are any doubts about the patient's position on the treatment apparatus 300 while receiving treatment, a medical professional may be capable of providing assistance. In this example embodiment, the dimensions of the apparatus may be the direct result of the evaluation operation 100, the interpretation operation 110 and the creation operation 120 of the method described in FIG. 1A.

Figure 3B:
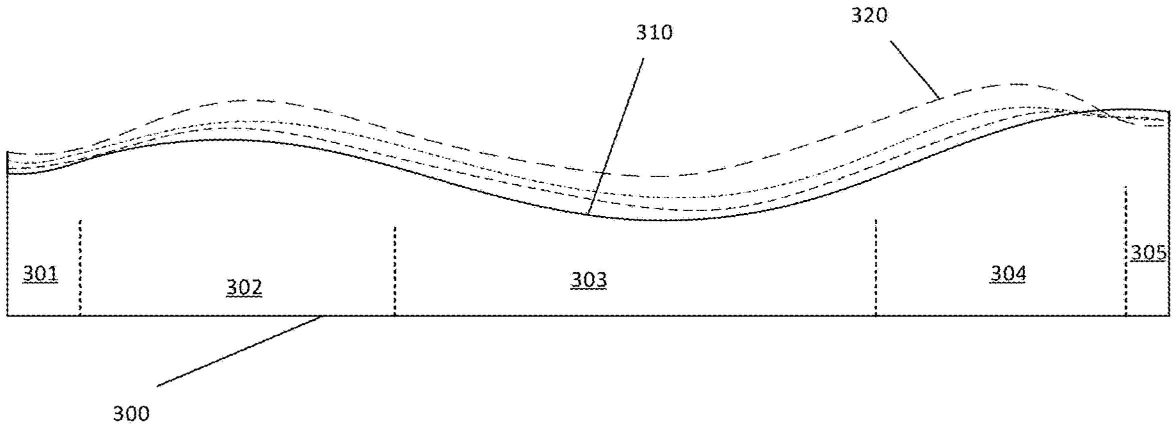
FIG. 3B illustrates a profile view of an apparatus with components according to an example embodiment.

In some example embodiments, the treatment apparatus 300 may include components or subassemblies in order to provide incremental treatment. FIG. 3B illustrates a profile view of an embodiment of the apparatus 300 from FIG. 3A. In the pictured example, the treatment apparatus 300 may be supplemented by components in the form of supplemental layers. Each individual one of the layers is indicated by a corresponding different dashed line depicted on the top side of the treatment apparatus 300 in FIG. 3B. In this embodiment, the treatment operation 130 may begin with the treatment apparatus 300 including only an initial layer 310 and none of the additional layers may be provided. As treatment progresses, the patient may add layers (components) to the treatment apparatus 300 as instructed by the medical professional to commence ensuing increments of the treatment operation 130. An increment is achieved when a layer is secured to the treatment apparatus 300. This procedure may be repeated until the end of the treatment operation 130, by which time the treatment apparatus 300 may consist of a plurality of layers from the initial layer 310 to a final layer 320. When the final layer 320 is engaged and the treatment operation 130 is completed, a patient and the treatment apparatus 300 enter the postural maintenance stage 140, since the final layer 320 embodies what is determined to be proper spinal curvature for the individual patient (i.e., based on specific information associated with the patient). It should also be appreciated that additional layers may include padding so as to provide the patient with a more comfortable treatment apparatus. The patient may return to the medical professional to receive each respective one of the layers (and/or have such layers installed by the medical professional). However, in other cases, the patient may receive each layer (e.g., via mail or delivery) with instructions on when to use each one, or with delivery timed to correspond to the timing of the treatment protocol.

Figure 3C:
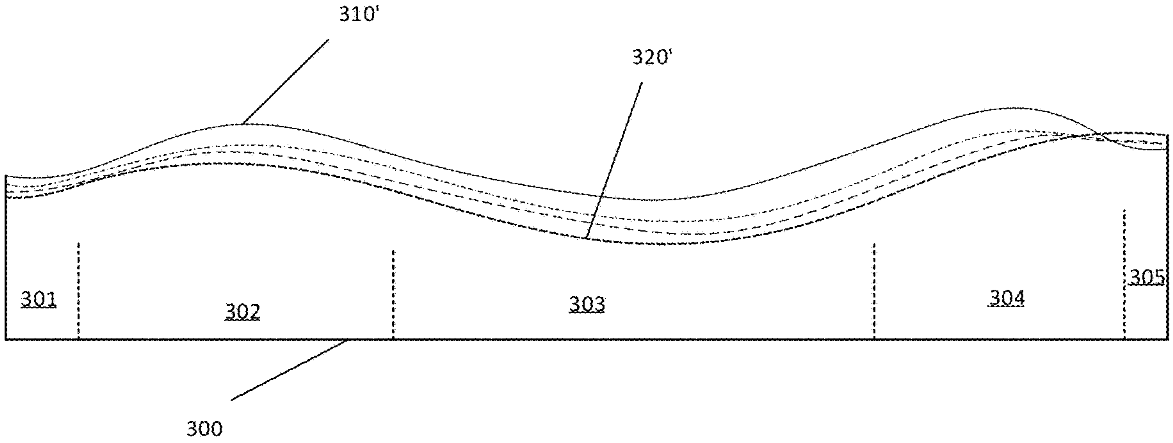
FIG. 3C illustrates a profile view of an apparatus with components according to an example embodiment.

Additionally, FIG. 3C illustrates a profile view of an embodiment of the treatment apparatus 300 from FIG. 3A. In the pictured example, the treatment apparatus 300 may be supplemented by components in the form of layers. The layers are indicated by the different dashed curved lines depicted on the top side of the apparatus in FIG. 3C. In this example embodiment, the treatment operation 130 may begin with the treatment apparatus 300 consisting of a plurality of layers, and the initial layer 310' may be the top layer of the treatment apparatus 300 while the final layer 320' may be the bottom layer of the treatment apparatus 300. In this embodiment, progressing through the increments of the treatment may involve removing a layer to commence the ensuing increment of treatment (instead of adding layers as described in reference to FIG. 3B). An increment may be engaged when a previous layer is removed from the treatment apparatus 300. This procedure may be repeated until the end of the treatment operation 130, by which time the treatment apparatus 300 may include only the final layer 320'. When the final layer 320' is engaged and the treatment operation 130 is completed, the patient and the apparatus enter the postural maintenance stage 140, since the final layer 320' embodies what is determined to be proper spinal curvature. It should also be appreciated that additional layers may include padding so as to provide the patient with a more comfortable treatment apparatus.

Figure 4A:
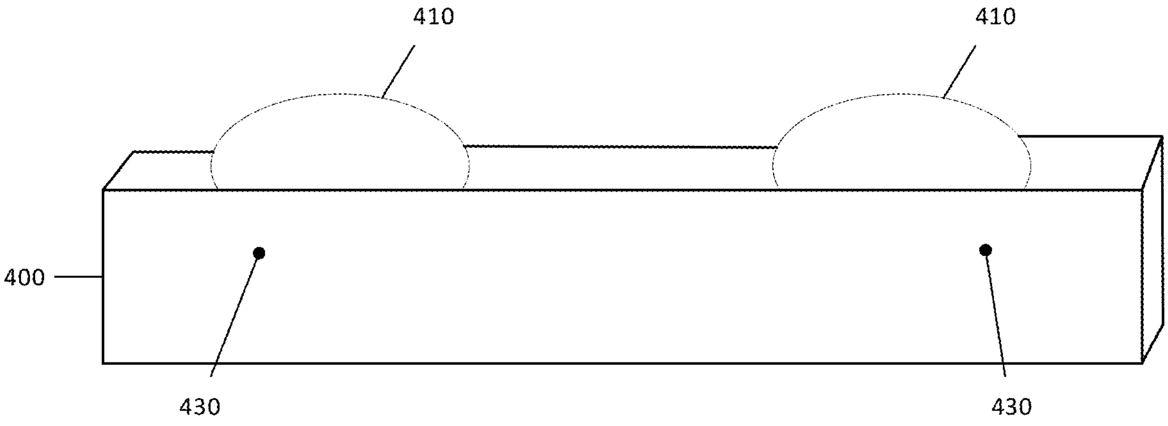
FIG. 4A illustrates an isometric view of an apparatus with components according to an example embodiment.
Figure 4B:
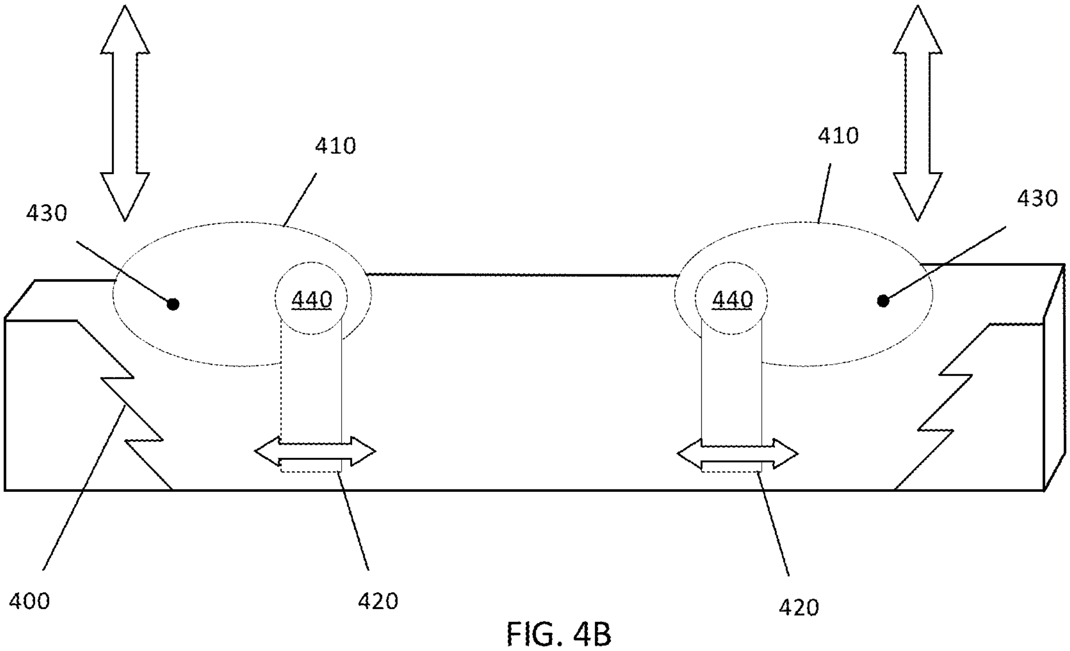
FIG. 4B illustrates an isometric view of an apparatus with components according to an example embodiment.

Whereas the treatment apparatus 300 of FIGS. 3A-3C is modified by adding or subtracting layers of material having curvature defined for each respective layer and step in a multi-step treatment protocol, other treatment paradigms are also possible. For example, instead of adding layers that effectively change the structure of the treatment apparatus 300, it may be possible to simply modify certain parameters or characteristics of the apparatus (or regions thereof). FIG. 4, which is defined by FIGS. 4A-4D illustrate one such example, In some example embodiments, a treatment apparatus 400 may comprise adjustable components or subassemblies in order to provide incremental treatment. The subassemblies that ultimately provide treatment to the patient may assume a multitude of positions or configurations. FIGS. 4A and 4B depict the treatment apparatus 400 utilizing subassemblies that may not be designed to be removed, but rather act as adjustable supports that are integrated into the treatment apparatus 400. In such examples, a subassembly may include a wheel 410 (or other pivotable member), a pivot support 420, an adjustment mechanism 430 and a pivot point 440. The wheels 410 may be fixable at a multitude of angles using the adjustment mechanism 430 to rotate the wheels 410 about the pivot point 440 by placing the pivot point 440 at an off-center portion of the wheel 410. The pivot point 440 is therefore the location at which the wheel 410 attaches to the pivot support 420. As noted above, the pivot point 440 may be offset with regard to the center of the wheel 410 in order to provide the subassemblies with the ability to achieve variable different angles for providing the desired spinal curvature in respective regions of the treatment apparatus 400 (e.g., in the lumbar and cervical regions). For the same reason, the shape of the wheel 410 may not be limited to being circular. The pivot supports 420 may be operably coupled to an apparatus 400 at the base of the pivot supports 420. In this regard, the subassemblies may be translatable along a length of the base structure by longitudinally moving or displacing the pivot supports 420. Additionally, the subassemblies may be configured to be fixed in place as desired, and can support the patient while the treatment apparatus 400 is in use. The adjustment mechanism 430 may comprise sliders. Delineations may also be provided at the adjustment mechanism to 430 to aid in positioning the wheel 410 at a desired setting or angle.

In an example embodiment, the sliders 430 may be configured to be fixed at predefined angle locations. The sliders may accomplish this via a mechanical locking design comprising handles attached to the wheels 410 and notches placed into curved channels cut into the side wall of the treatment apparatus 400 as shown in FIG. 4A. In this regard, a patient can displace the handle of a slider 430 in the channel thereby rotating a wheel (as depicted in the cutaway diagram of FIG. 4B). A patient may also secure the handle to a notch providing the wheel 410 with the correct predefined position corresponding to the desired increment of treatment. In this case, an increment of treatment may be enabled when all subassemblies have been adjusted to their desired positon.

Figure 4C:
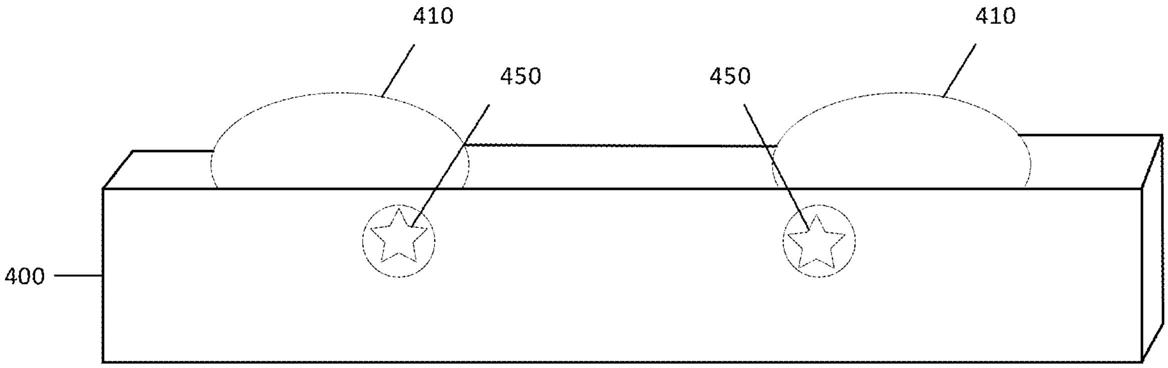
FIG. 4C illustrates an isometric view of an apparatus with components according to an example embodiment.
Figure 4D:
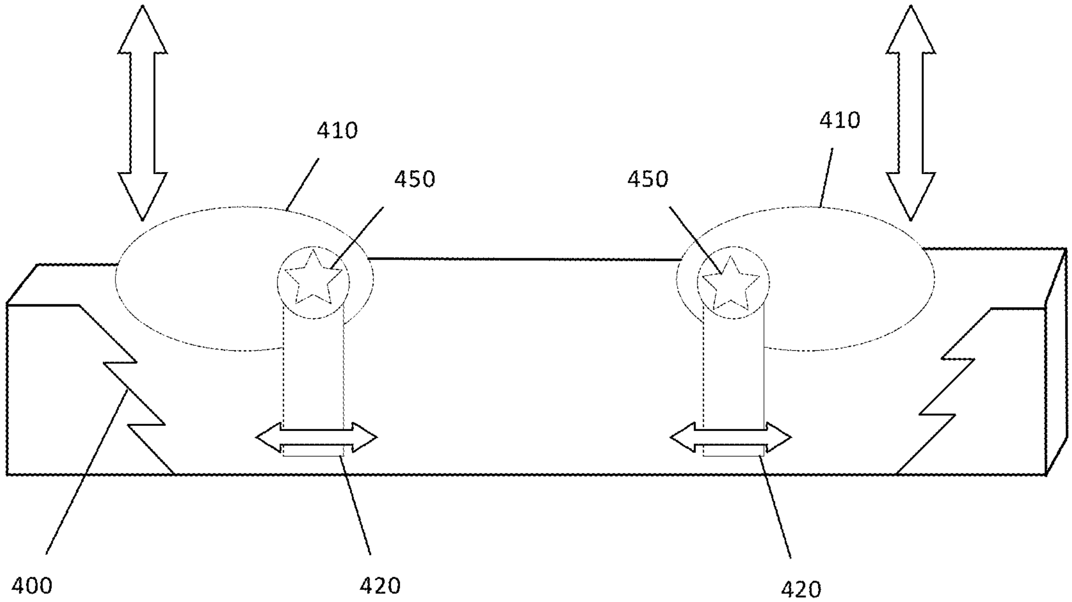
FIG. 4D illustrates an isometric view of an apparatus with components according to an example embodiment.
Figure 6:
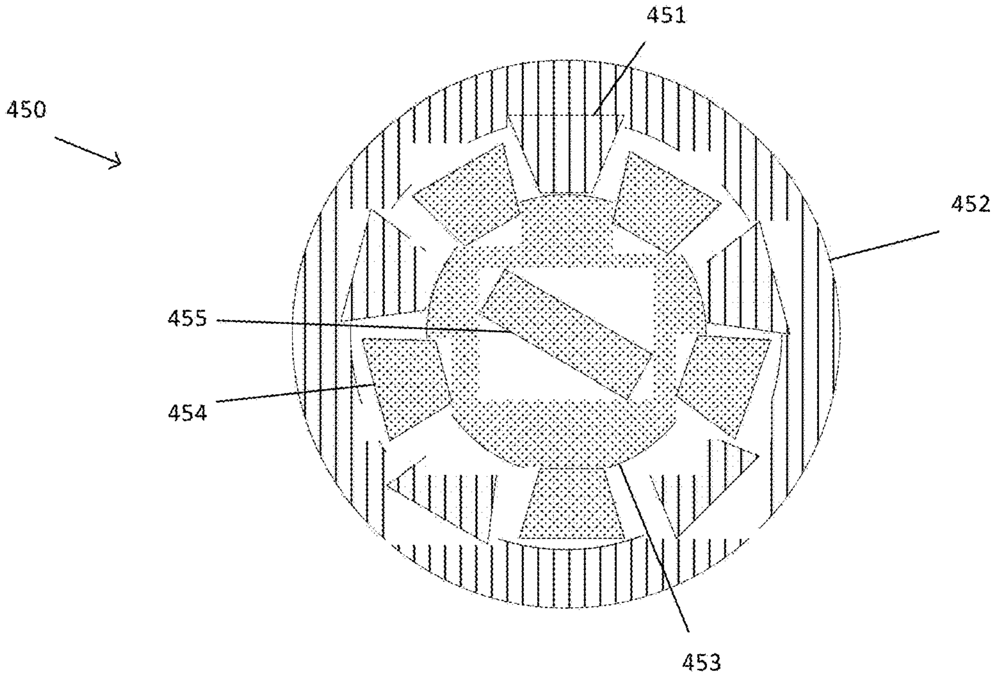
FIG. 6 illustrates an adjustment mechanism in accordance with an example embodiment.

FIGS. 4C and 4D illustrate an additional example embodiment where sliders 430 are replaced with an alternate adjustment mechanism The adjustment mechanism may be embodied as a locking dial 450. While functionally identical to the sliders 430 (e.g., wheels 410 are fixable at predefined angles), the operation of the locking dial 450 may be different. An operator may first pull on the handle of the mechanism to disengage the gear teeth and be free to rotate the mechanism. Once the teeth are disengaged, the operator may rotate the dial to line up with a desired predefined angle for the wheels 410. Greater details of the locking dial mechanism are disclosed later in relation to FIG. 6.

As can be appreciated from the descriptions of the treatment apparatus 400 above, the protocol treatment may define settings for longitudinal placement of the pivot supports 420 and/or settings for rotating the wheels 410. This gives the treatment apparatus 400 flexibility to be configurable for any of various different patients, and also be configurable to the respective different settings needed for treatment of one individual patient. As such, the treatment apparatus 400 can be mass produced (perhaps in a series of sizes that relate to ranges of spine lengths or patent heights) and configured according to individual case needs.

Figure 5:
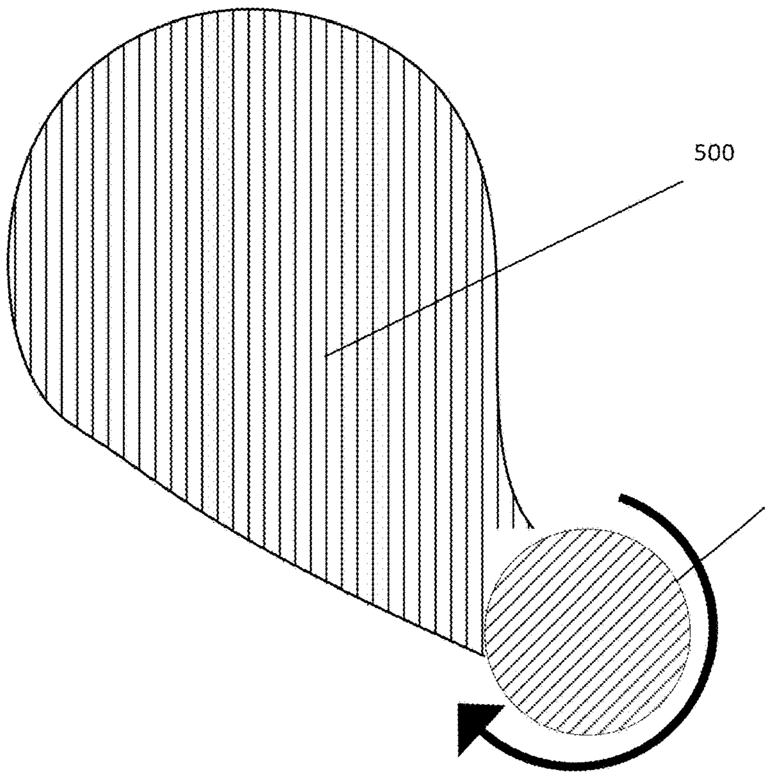
FIG. 5 illustrates a profile view of a component according to an example embodiment.

FIG. 5 illustrates an example embodiment of a wheel 500 of a subassembly. In this embodiment, the wheel may be given a teardrop shape where the pivot point 440 is located at the narrow end of the teardrop. The use of non-uniform shapes for wheels in a subassembly may depend on the desire to provide the best natural curvature of the spine for the patient. In this regard, the wheels may take on other shapes in other example embodiments, such as, but not limited to, ellipses and circles. It should also be noted that the rotation of the wheel 500 in FIG. 5 may not be limited to the clockwise direction, but can indeed be adjusted in both the clockwise and counterclockwise directions.

As mentioned above, FIG. 6 illustrates an example embodiment of a locking dial adjustment mechanism 450. The mechanism may comprise outer gear teeth 451, an outer gear ring 452, an inner gear ring 453, inner gear teeth 454 and a handle 455. The mechanism may be operated by an operator pulling on the handle 455 in the direction coming out of the page. The pulling action may release the contact of the inner gear teeth 454 and outer gear teeth 451 and enable the mechanism to be freely rotated via the handle 455. While the outer gear ring 452 and outer gear teeth 451 remain stationary, the operator may turn the inner gear ring 453 and inner gear teeth 454 to a desired predefined angle for the wheel 410. The wheel 410 is operably connected to the adjustment mechanism 450 and may thus rotate as the mechanism 450 is operated. Upon finding the desired angle, the operator may then push in the inner gear ring 453 and inner gear teeth 454 so that the inner and outer sets of gear teeth are in contact again and the wheel 410 is therefore secure and ready for use.

In an additional example embodiment of a locking dial adjustment mechanism, an adjustment mechanism may comprise a coil spring tensioning mechanism. In such an embodiment, upon an operator turning a winding key, a spring may have its outer diameter altered. The mechanism may comprise predefined angles to which the winding key can be set, and the mechanism may also be configured to hold the position it is given using the likes of gear teeth. In this embodiment, the adjustable outer diameter of the spring may provide variable amounts of curvature as demanded by the treatment.

Figure 7:
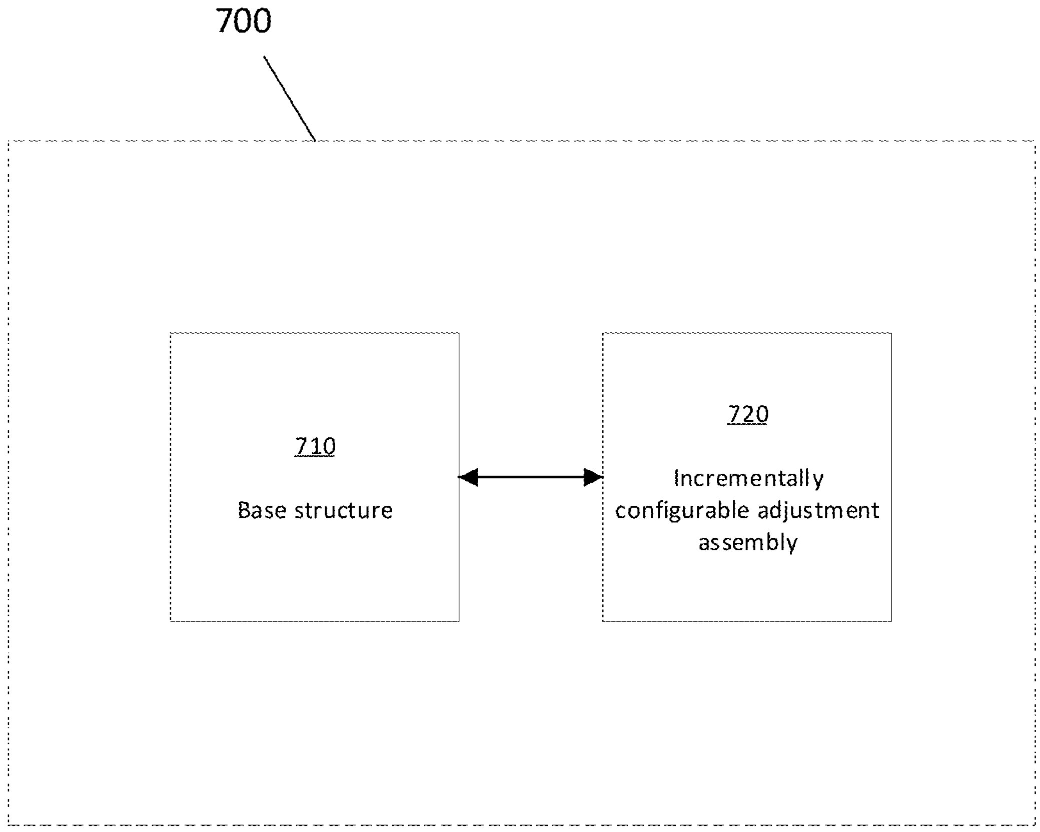
FIG. 7 illustrates a block diagram of an apparatus with components in accordance with an example embodiment.

As can be appreciated from the descriptions above, there may be a number of different specific ways to implement a treatment apparatus capable of being used in connection with example embodiments. The examples in FIGS. 3A-3C and 4A-4D merely represent a couple specific examples. Meanwhile, FIG. 7 illustrates a block diagram more generally descriptive of an example embodiment of an apparatus for providing spinal compensation therapy. In this example embodiment, a treatment apparatus 700 may be provided that is configurable in increments that permit a patient to progressively receive compensation analysis and a treatment apparatus tailored to him/her based on such analysis. The treatment apparatus 700 may include a base structure 710 and an incrementally configurable adjustment assembly 720. The base structure 710 may be configured to support the incrementally configurable adjustment assembly 720. The incrementally configurable adjustment assembly 720 may be adjustable (e.g., either with integrally formed and adjustable components, or with addable or removable layers) between at least an initial configuration, an intermediate configuration and a target configuration. The specific configuration at any given time may be decided upon based on a patient's progress in the progressive therapy defined specifically for that patient. The initial configuration may define spinal curves generated based on a patient's initial parameters to progress toward the target configuration and the intermediate configuration may define modified spinal curves relative to progress made up to an intermediate point of the therapy toward achieving a target level of compensation or an ending point of the progressive states of the therapy at the target configuration. The configurations of the incrementally configurable adjustment assembly 720 may be achieved through any of the aforementioned structures and embodiments. Thus, in some cases, the base structure 710 may itself define either the initial configuration or the target configuration, and modifications may be used to define the other configurations. However, in some cases, parameters or settings may be defined for adjusting the incrementally configurable adjustment assembly 720 through each of the initial, intermediate and target configurations. Patients may therefore use the treatment apparatus 700 to improve their spinal alignment or curvature, and to routinely maintain the same thereafter.

Accordingly, some example embodiments may define a treatment apparatus for providing spinal compensation therapy. The treatment apparatus may include a base structure configured to support a patient lying in a supine position on the treatment apparatus, and an incrementally configurable adjustment assembly configured to modify the base structure between an initial configuration, an intermediate configuration, and a target configuration. The initial configuration may define spinal curves generated based on initial patient parameters associated with evaluation of the patient to define a first increment in progress toward the target configuration, and the intermediate configuration may define modified spinal curves relative to the initial configuration to define a second increment in the progress toward the target configuration.

In some example embodiments, the treatment apparatus may include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. In this regard, for example, the base structure may have a selected length based on the initial patient parameters, and the incrementally configurable adjustment assembly may include a plurality of layers of material that are sequentially overlaid on the base structure to define respective ones of the intermediate configuration and the target configuration. In some such example embodiments, the base structure may define the initial configuration. In an example embodiment, the incrementally configurable adjustment assembly may include a plurality of layers of material that are sequentially removed to define respective ones of the intermediate configuration and the initial configuration. In some such example embodiments, the base structure may define the target configuration. In an example embodiment, the incrementally configurable adjustment assembly may include a pivotable member, a pivot support, and an adjustment mechanism. The pivotable member may be operably coupled to the pivot support at a pivot point, and the adjustment mechanism may be operably coupled to the pivotable member to enable adjustment of the pivotable member about the pivot point to create a curve relative to a top surface of the base structure. In some cases, the base structure may be divided into regions corresponding to sacrum, lumbar, thoracic, cervical and occiput, and a separately adjustable instance of the incrementally configurable adjustment assembly may be disposed at each of the in the lumbar and cervical regions. In an example embodiment, the pivot support may be movable longitudinally along the base portion. In some cases, delineations may be provided at the adjustment mechanism to aid in positioning the pivotable member at a desired setting. In an example embodiment, the adjustment mechanism may include a lockable slider configured to rotate the pivotable member to predefined angles depending on a stage of the compensation therapy. In an example embodiment, the adjustment mechanism may include a locking dial including intersecting inner and outer gear teeth. The locking dial may be configured to rotate the pivotable member to predefined angles depending a stage of the compensation therapy. In some cases, the initial, intermediate and target configurations may be generated by a computer program configured to define corresponding settings of the incrementally configurable adjustment assembly at each of the initial, intermediate and target configurations, respectively.

In another example embodiment, a method for providing spinal compensation therapy for a patient may be provided. The method may include receiving baseline data comprising initial patient parameters, evaluating the baseline data to determine a treatment plan comprising at least an initial configuration, an intermediate configuration, and a target configuration for a configurable treatment apparatus, and defining parameters for the treatment apparatus according to the initial configuration, the intermediate configuration, and the target configuration along with corresponding periods of time over which the patient is directed to lie in a supine position on the treatment apparatus.

In some example embodiments, the method may include additional, optional operations, and/or the operations described above may be modified or augmented. Some examples of modifications, optional operations and augmentations are described below. It should be appreciated that the modifications, optional operations and augmentations may each be added alone, or they may be added cumulatively in any desirable combination. In this regard, for example, the treatment apparatus may include a base structure configured to support a patient lying in the supine position, and an incrementally configurable adjustment assembly configured to modify the base structure between the initial configuration, the intermediate configuration, and the target configuration. The initial configuration may define spinal curves generated based on the initial patient parameters to define a first increment in progress toward the target configuration. The intermediate configuration may define modified spinal curves relative to the initial configuration to define a second increment in the progress toward the target configuration. Defining parameters for the treatment apparatus may include defining a structural composition or settings for the incrementally configurable adjustment assembly corresponding to each respective one of the initial configuration, the intermediate configuration, and the target configuration. In an example embodiment, the intermediate configuration may include one or more intermediate configurations, and a distance between a spine location according to the initial patient parameters and a spine location according to the target configuration divided by a maximum incremental change per increment may be used to determine a number of the intermediate configurations. In some cases, defining the structural composition may include defining a plurality of layers of material that are sequentially overlaid on the base structure to define respective ones of the initial configuration, the intermediate configuration or the target configuration. In an example embodiment, defining the structural composition may include defining a plurality of layers of material that are sequentially removed to define respective ones of the initial configuration, the intermediate configuration or the target configuration. In some cases, the incrementally configurable adjustment assembly may include a pivotable member, a pivot support, and an adjustment mechanism. The pivotable member may be operably coupled to the pivot support at a pivot point, and defining settings for the incrementally configurable adjustment assembly may include actuating the adjustment mechanism to pivot the pivotable member about the pivot point to create a curve relative to a top surface of the base structure. In an example embodiment, the base structure may be divided into regions corresponding to sacrum, lumbar, thoracic, cervical and occiput, and a separately adjustable instance of the incrementally configurable adjustment assembly may be disposed at each of the in the lumbar and cervical regions. In such an example, defining settings for the incrementally configurable adjustment assembly may include defining settings for each respective one of the separately adjustable instances of the incrementally configurable adjustment assembly. In some cases, defining settings for the incrementally configurable adjustment assembly may include moving the pivot support longitudinally along the base portion.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A treatment apparatus for providing spinal compensation therapy, the apparatus comprising:

a base structure, the base structure being configured to support a patient lying in a supine position on the treatment apparatus; and an incrementally configurable adjustment assembly operably coupled to the base structure, the incrementally configurable adjustment assembly being adjustable between an initial configuration, an intermediate configuration, and a target configuration, wherein the initial configuration of the incrementally configurable adjustment assembly defines spinal curves generated based on initial patient parameters associated with an evaluation of the patient to define a first increment in progress toward the target configuration, wherein the intermediate configuration of the incrementally configurable adjustment assembly defines modified spinal curves relative to the initial configuration to define a second increment in the progress toward the target configuration, wherein the target configuration of the incrementally configurable adjustment assembly defines modified spinal curves relative to the intermediate configuration to define a third and final increment in the spinal compensation therapy, wherein the incrementally configurable adjustment assembly comprises:

a first pivotable member, the first pivotable member being supported by a first pivot support operably coupled to the base structure, a second pivotable member, the second pivotable member being supported by a second pivot support operably coupled to the base structure, a first adjustment mechanism operably coupled to the first pivotable member, the first pivotable member being pivotable about a first pivot point via the first adjustment mechanism, and a second adjustment mechanism operably coupled to the second pivotable member, the second pivotable member being pivotable about a second pivot point via the second adjustment mechanism, wherein the first and second pivotable members each comprise an entirely arcuate perimeter such that the first and second pivotable members define respective first and second curves at a top surface of the base structure that engage the patient, wherein the first, second and third increments each correspond to respective different first and second curves based on a selected angle of a plurality of predefined angles of the first and second pivotable members, and wherein the first and second pivot points are disposed at an end of the first and second pivotable members, respectively.

2. The apparatus of claim 1, wherein the base structure is divided into regions corresponding to sacrum, lumbar, thoracic, cervical and occiput regions of a spine of the patient, and wherein the first pivotable member is disposed at the lumbar regions and the second pivotable member is disposed at the cervical region.

3. The apparatus of claim 1, wherein the first and second pivot supports are movable longitudinally along the base structure.

4. The apparatus of claim 1, wherein delineations are provided at the first and second adjustment mechanisms to aid in positioning the first and second pivotable members at respective desired settings.

5. The apparatus of claim 1, wherein the first and second adjustment mechanisms comprises a lockable slider configured to pivot the first and second pivotable members to the selected angles of the plurality of predefined angles that correspond to the first, second and third increments of the spinal compensation therapy.

6. The apparatus of claim 1, wherein the first and second adjustment mechanisms comprises a locking dial comprising:

an inner gear ring having inner gear teeth; and an outer gear ring having outer gear teeth, wherein the locking dial is configured to rotate the first and second pivotable members to one of the plurality of predefined angles based on a stage of the spinal compensation therapy, wherein the inner gear ring is axially translatable relative to the outer gear ring between a rotatable position in which the inner gear ring is offset from the outer gear ring, and a locked position in which the inner gear ring is engaged with the outer gear ring, and wherein in the rotatable position, the inner gear ring is rotatable relative to the outer gear ring.

7. A method for providing spinal compensation therapy for a patient, the method comprising:

receiving baseline data comprising initial patient parameters;

evaluating the baseline data to determine a treatment plan comprising at least an initial configuration, an intermediate configuration, and a target configuration for a configurable treatment apparatus; and defining parameters for the configurable treatment apparatus according to the initial configuration, the intermediate configuration, and the target configuration along with corresponding periods of time over which the patient is directed to lie in a supine position on the treatment apparatus, wherein the configurable treatment apparatus comprises:

a base structure configured to support the patient lying in the supine position; and an incrementally configurable adjustment assembly operably coupled to the base structure, the incrementally configurable adjustment assembly being adjustable between the initial configuration, the intermediate configuration, and the target configuration, wherein the initial configuration of the incrementally configurable adjustment assembly defines spinal curves generated based on initial patient parameters associated with an evaluation of the patient to define a first increment in progress toward the target configuration, wherein the intermediate configuration of the incrementally configurable adjustment assembly defines modified spinal curves relative to the initial configuration to define a second increment in the progress toward the target configuration, wherein the target configuration of the incrementally configurable adjustment assembly defines modified spinal curves relative to the intermediate configuration to define a third and final increment in the spinal compensation therapy, wherein the incrementally configurable adjustment assembly comprises:

a first pivotable member, the first pivotable member being supported by a first pivot support operably coupled to the base structure, a second pivotable member, the second pivotable member being supported by a second pivot support operably coupled to the base structure, a first adjustment mechanism operably coupled to the first pivotable member, the first pivotable member being pivotable about a first pivot point via the first adjustment mechanism, and a second adjustment mechanism operably coupled to the second pivotable member, the second pivotable member being pivotable about a second pivot point via the second adjustment mechanism, wherein the first and second pivotable members each comprise an entirely arcuate perimeter such that the first and second pivotable members define respective first and second curves at a top surface of the base structure that engage the patient, wherein the first, second and third increments each correspond to respective different first and second curves based on a selected angle of a plurality of predefined angles of the first and second pivotable members, and wherein the first and second pivot points are disposed at an end of the first and second pivotable members, respectively.

8. The method of claim 7, wherein defining parameters for the treatment apparatus comprises defining settings for the incrementally configurable adjustment assembly corresponding to each respective one of the initial configuration, the intermediate configuration, and the target configuration.

9. The method of claim 7, wherein the intermediate configuration comprises one or more intermediate configurations, and wherein a distance between a spine location according to the initial patient parameters and a spine location according to the target configuration divided by a maximum incremental change per increment determines a number of the intermediate configurations.

10. The method of claim 8, wherein defining settings for the incrementally configurable adjustment assembly comprises actuating the first and second adjustment mechanisms to pivot the first and second pivotable members about the first and second pivot points, respectively, to create the first and second curves relative to the top surface of the base structure.

11. The method of claim 10, wherein the base structure is divided into regions corresponding to sacrum, lumbar, thoracic, cervical and occiput regions of a spine of the patient, wherein the first pivotable member is disposed at the lumbar region, and the second pivotable member is disposed at the cervical region, and wherein defining settings for the incrementally configurable adjustment assembly comprises defining settings for each of the first and second pivotable members.

12. The method of claim 10, wherein defining settings for the incrementally configurable adjustment assembly comprises moving the first and second pivot supports longitudinally along the base structure.

13. The apparatus of claim 1, wherein the first and second pivotable members are elliptical in shape.

14. The apparatus of claim 1, wherein the first and second pivotable members are teardrop shaped and the first and second pivot points are disposed at a pointed end of the first and second pivotable members.

15. The apparatus of claim 1, wherein the first and second pivotable members are mirrored relative to one another about a midplane of the base structure.

16. The apparatus of claim 6, wherein axially translating the inner gear ring to the rotatable position disengages the inner gear ring from the outer gear ring, and wherein the inner gear ring is axially translated by applying a first axial force on the inner gear ring directed perpendicularly away from the base structure along an axis of rotation of the locking dial such that the inner gear ring of the locking dial slides along an axis of rotation away from the outer gear ring and into the rotatable position.

17. The apparatus of claim 16, wherein in the rotatable position, the inner gear ring of the locking dial is rotatable relative to the outer gear ring of the locking dial to pivot the first and second pivotable members about the first and second pivot points.

18. The apparatus of claim 17, wherein axially translating the inner gear ring to the locked position engages the inner gear ring with the outer gear ring, and wherein the inner gear teeth reengage the outer gear teeth responsive to aligning the locking dial with one of the plurality of predefined angles and applying a second axial force in an opposite direction from the first axial force such that the inner gear ring of the locking dial slides along the axis of rotation toward the outer gear ring and into the locked position in which the inner gear teeth are engaged with the outer gear teeth.

19. The apparatus of claim 1, wherein the first and second pivotable members are planar.

20. The apparatus of claim 19, wherein the first and second pivot points define respective first and second pivot axes that extend perpendicularly through the first and second pivotable members, respectively, and perpendicular to a direction of longitudinal extension of the base structure.

* * * * *